United States Patent [19]

Tooyama

[11] 4,232,206
[45] Nov. 4, 1980

[54] SIGNAL TRANSMISSION CONTROL SYSTEM

[75] Inventor: Eiji Tooyama, Hitachi, Japan

[73] Assignee: Hitachi, Ltd., Japan

[21] Appl. No.: 971,110

[22] Filed: Dec. 19, 1978

[30] Foreign Application Priority Data

Dec. 19, 1977 [JP] Japan .................................. 52-151818

[51] Int. Cl.² .............................................. H04B 3/46
[52] U.S. Cl. ............................................. 179/175.3 S
[58] Field of Search .................... 179/175.3 S, 15 BF, 179/15 AL; 325/2; 340/147.5 C; 333/3

[56] References Cited

U.S. PATENT DOCUMENTS

| | | | |
|---|---|---|---|
| 3,409,877 | 11/1968 | Alterman et al. | 179/175.3 S |
| 3,859,468 | 1/1975 | Smith et al. | 179/15 BF |
| 3,983,340 | 9/1976 | Lima et al. | 179/175.3 S |

Primary Examiner—Thomas A. Robinson
Attorney, Agent, or Firm—Craig & Antonelli

[57] ABSTRACT

A control system for use with a data transmission system having a plurality of subscriber stations connected exchangeably to a pair of transmission paths comprises a transmission control station provided for each of the transmission paths which produce an access signal to enable data transmission to be performed among the subscriber stations. One of the control stations is constantly operated, while the other control station serves as a stand-by station. When the access signal is not supplied to the subscriber station properly within a predetermined time, the subscriber station is disconnected from the operative transmission path and self-checking is executed. If abnormality is found to be present in the subscriber station through the self-checking, the latter is held in the disconnected state. When abnormality is detected in the operative transmission path, the subscriber stations are changed over to the stand-by transmission path. When abnormality is found in the in-service primary control station or in the transmission path, the control functions of the primary station are transferred to the stand-by transmission control station.

6 Claims, 9 Drawing Figures

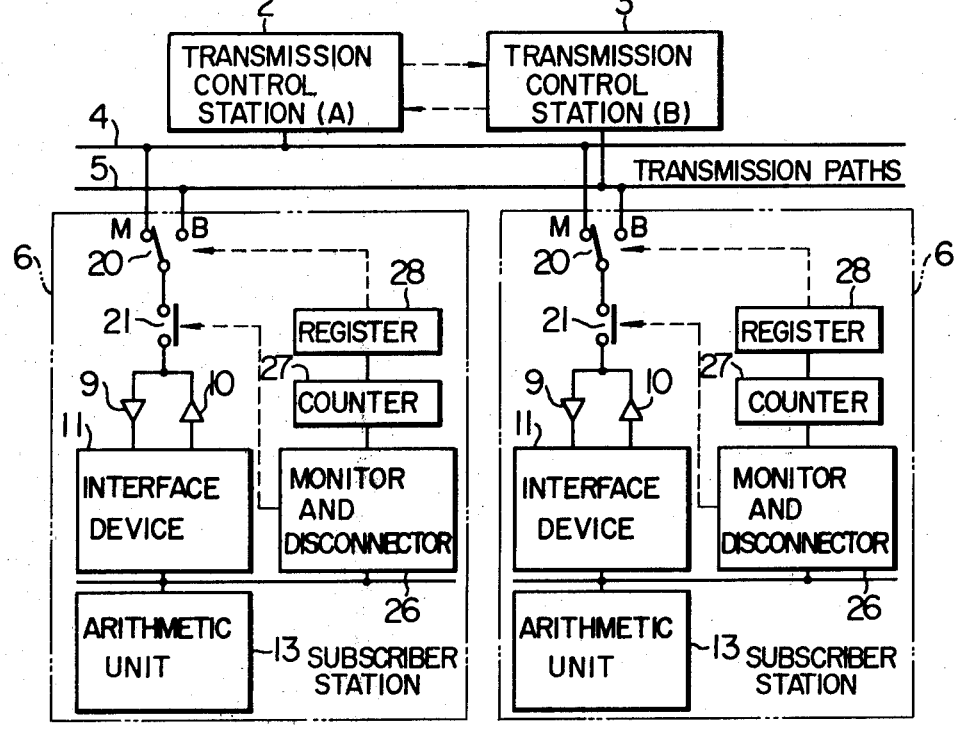

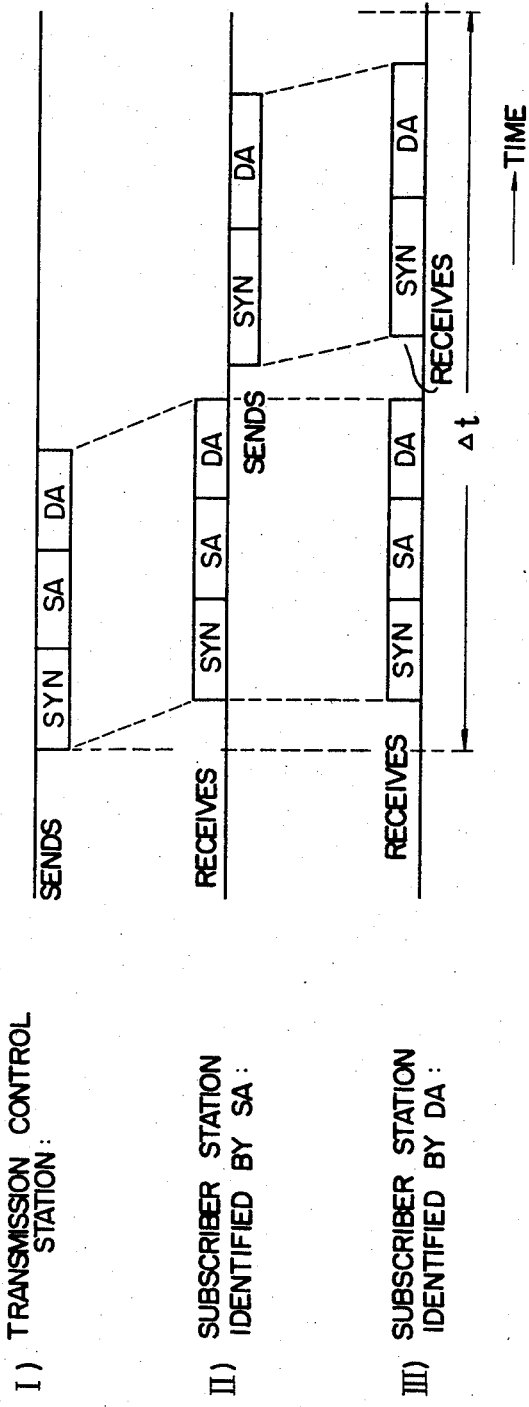

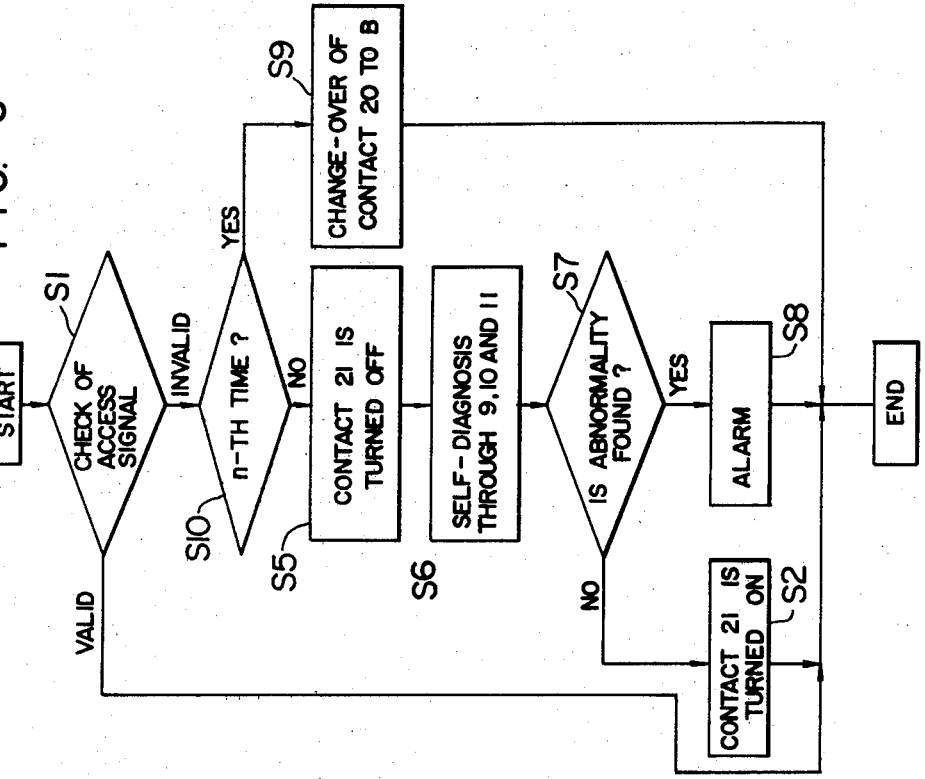
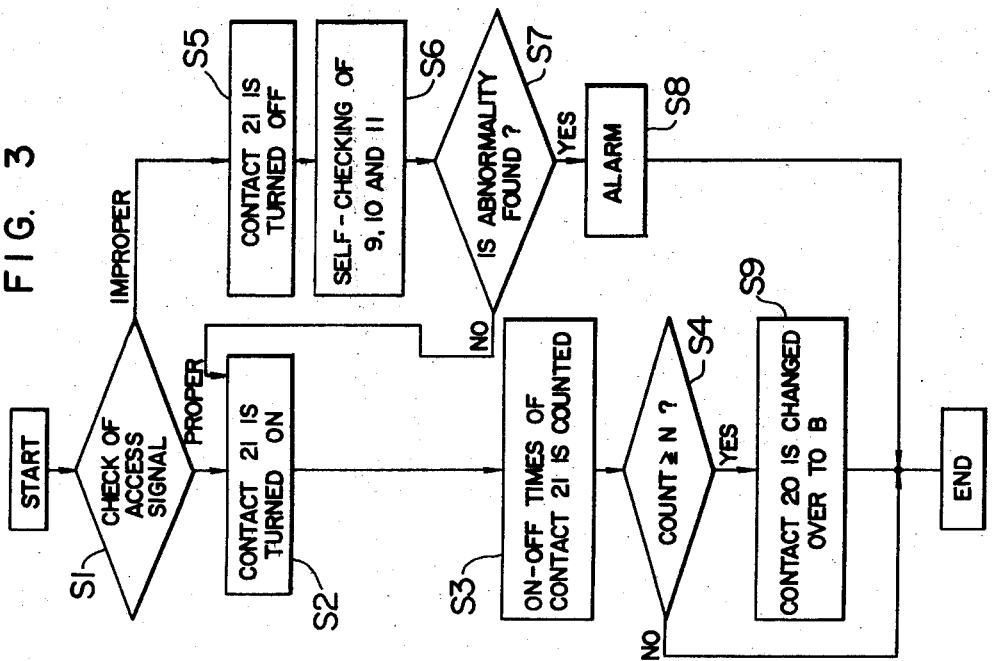

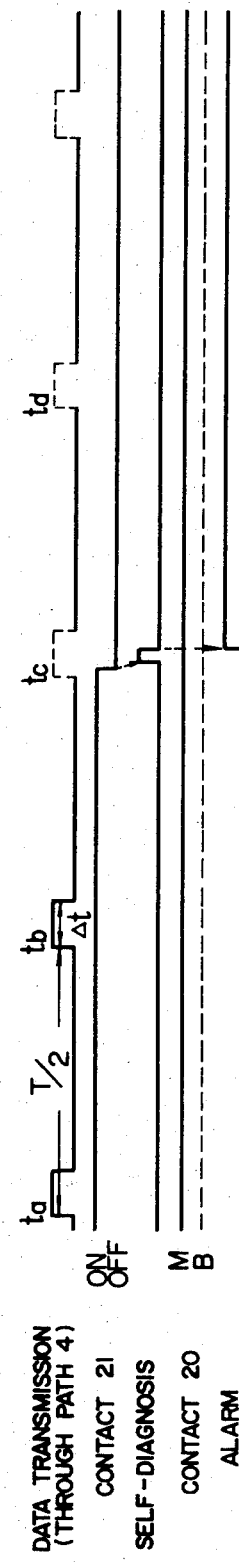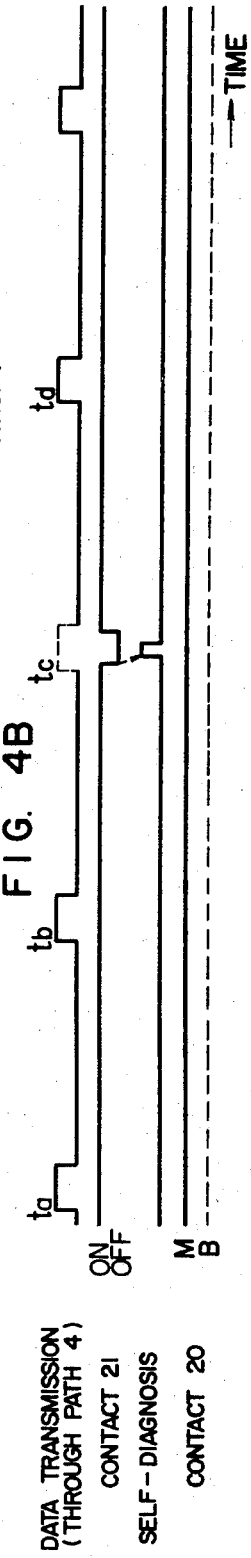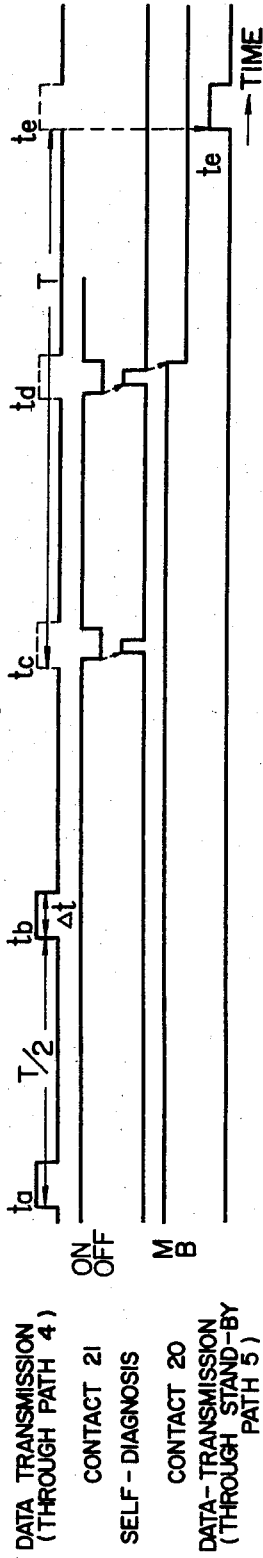

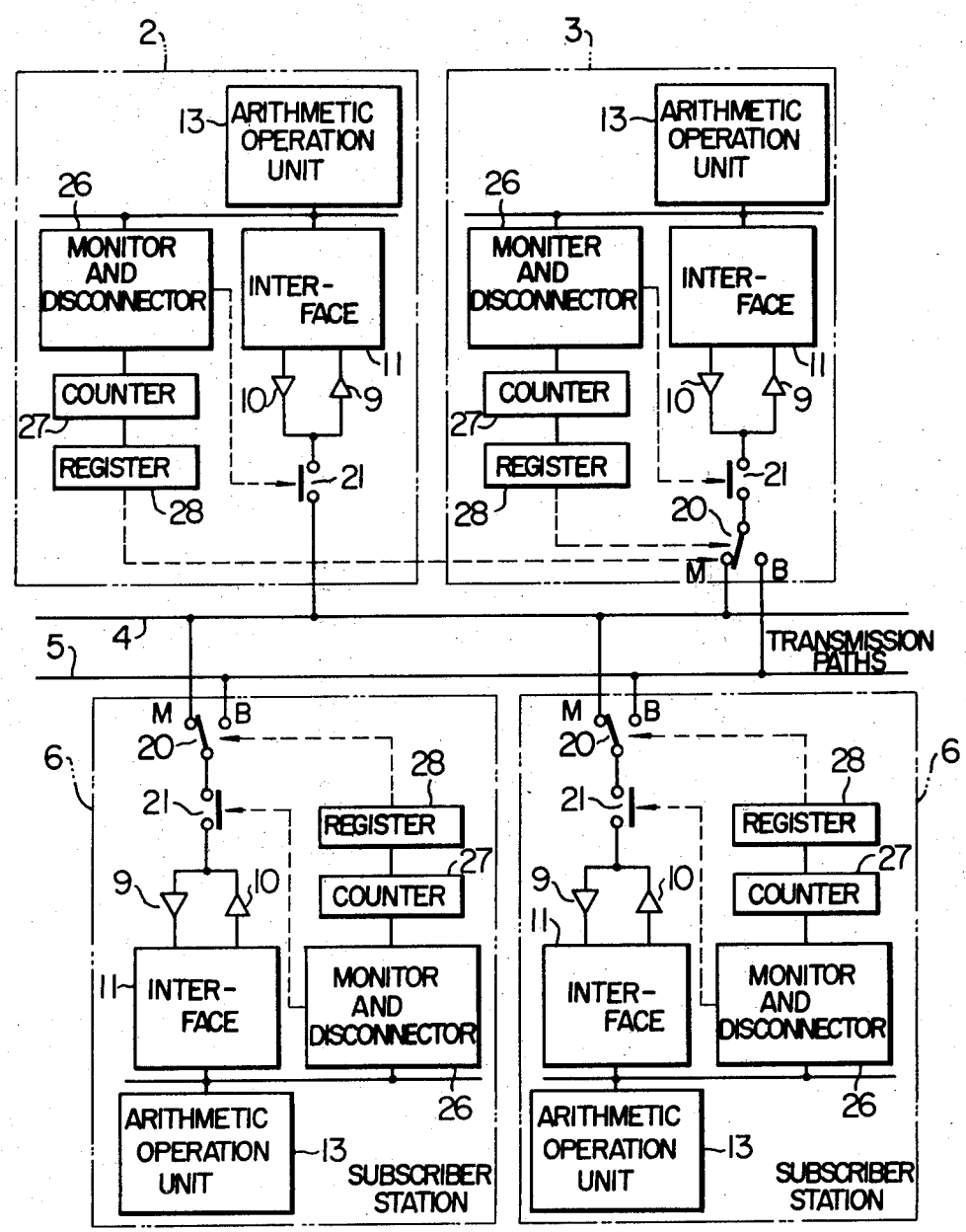

SIGNAL TRANSMISSION CONTROL SYSTEM

BACKGROUND OF THE INVENTION

1. Field of the Invention

The present invention relates to a signal transmission control system for controlling communication or data exchanges among a plurality of subscriber stations provided along signal transmission paths. In particular, the invention is intended to improve the signal transmission control system having dual transmission paths such that changing-over of the in-service transmission path to a stand-by transmission path upon occurrence of abnormal conditions can be realized smoothly and that the area suffering from such abnormality can be easily localized.

2. Description of the Prior Art

There has been widely used a signal transmission or communication system in which a number of subscriber stations are coupled to a set of transmission paths for performing information or data exchanges among the subscriber stations. In such communication system, a failure in the transmission path itself or in the sender portion of a subscriber station may exert adverse influence to the whole communication system, thereby rendering the data transmission impossible and possibly shutting down the whole system.

With a view to protecting the communication system from such disastrous situation, it is known and actually adopted to provide the transmission paths in duplicate with one of the transmission paths being used as the primary or in-service path, while the other is adapted to serve as the stand-by path for replacing the primary transmission path when some abnormality or failure occurs. More particularly, a plurality of transmitter and receiver stations which will be herein referred to also as subscriber stations are coupled to a pair of transmission paths which will be identified by labels A and B for convenience of description. Each of the subscriber stations is composed of a first input/output device connected to the transmission path A for data reception and transmission, a second input/output device connected to the other transmission path B for data reception and transmission, an arithmetic unit for executing arithmetic operations on the basis of the data or information received through the input/output devices and sending out the results of the operations to the transmission paths through the respective input/output devices, and a switching control unit for enabling the function of the first input/output device, when the transmission path is used as the primary or in-service path, and at the same time invalidating the output function of the second inpput/output device connected to the path B with only the input function thereof being validated. When the transmission paths A and B are interchanged the output function of the first input/output device is inhibited with the function of the second input/output device being wholly enabled. On the other hand, a transmission control station for controlling data transmission among the subscriber stations is separately provided for each of the transmission paths A and B with the control output function of the transmission control station for the transmission path B being inhibited. In such data transmission system, since only one transmission path is constantly being used, it is impossible to transmit simultaneously a number of data. Consequently, the transmission control station supervises and controls properly the subscriber stations between which the data exchange is to take place. With such arrangement of the data transmission control system, occurrence of abnormality in data or signal transmission is detected by the in-service transmission control station associated with the transmission path A which detection may be effected by utilizing the fact that access or call signal to the subscriber stations produced from the in-service control station is deviated from the standard signal, for example. When such abnormality is detected, the control station for the transmission path B is validated for operation while the control station for the transmission path A is caused to stop the supervisory operation. Correspondingly, when the call or access signal from the control station for the path B is supplied to the second input/output device of the subscriber station coupled to the path B, the switching control unit is operated, whereby the output function of the input/output devices of the subscriber stations connected to the path B is enabled with the output function of the input/output devices connected to the transmission path A inhibited. By virtue of such switching control for the transmission paths, it is certainly possible to perform the information transmission among the subscriber stations continuously without being interrupted or shut down.

However, in the hitherto known data transmission control system, it is impossible or at least very difficult to specify the place or location at which the abnormal situation or failure occurs, as a result of which extremely time-consumed procedures are required for restoring the disconnected subscriber station or transmission path to the original normal conditions. Thus, there is a need for the signal transmission control system which is capable of localizing the area or region at which the abnormal condition or failure takes place.

SUMMARY OF THE INVENTION

Accordingly, a primary object of the invention is to provide a signal transmission control system having dual transmission paths in which one path is adapted to serve as the primary or in-service transmission path while the other is adapted to serve as the stand-by transmission path and which is capable of replacing the primary transmission path by the stand-by path upon occurrence of abnormal condition in the primary transmission path.

Another object of the invention is to provide a signal transmission control system of the above type which is further capable of localizing the region or area at which abnormality or failure takes place.

According to an aspect of the invention, transmission control stations are each provided for each of the dual transmission paths with one station being used, while the other control station is held in the unused state. When the call or access signal from the operative or in-service control station is not received by the subscriber station properly within a predetermined period, that subscriber station is disconnected from the in-service transmission path and subsequently self-checking for determining if abnormality is present in the disconnected subscriber station itself. When the result of the self-checking is affirmative, the subscriber station in concern is held in the disconnected state. On the other hand, when the abnormality is determined to be ascribable to causes exterior to the subscriber station, the latter is changed over to the unused or stand-by transmission path. On the other hand, when the in-service control station detects an abnormality or failure within itself or in the operative transmission path, the control functions are transferred to the stand-by control station which will then perform the control operation in the subsequent signal transmission.

BRIEF DESCRIPTION OF THE DRAWINGS

FIG. 1 is a block diagram to show schematically a general arrangement of the signal transmission control system according to an embodiment of the invention.

FIG. 2 is to illustrate the principle on the basis of which the signal transmission control system shown in FIG. 1 is operated.

FIG. 3 is a flow chart to illustrate operation of a monitoring and disconnecting circuit according to an embodiment of the invention.

FIGS. 4A to 4C show signal wave diagrams to illustrate variations in various signals produced in transmission control stations when a subscriber station is changed over to a stand-by transmission path in accordance with programmed routine shown in FIG. 3.

FIG. 5 illustrates in a flow chart operations of the monitoring and disconnecting circuit according to another embodiment of the invention.

FIG. 6 is a block diagram to show a general arrangement of the signal transmission control system according to still another embodiment of the invention.

DETAILED DESCRIPTION OF THE PREFERRED EMBODIMENTS

Figure 7:
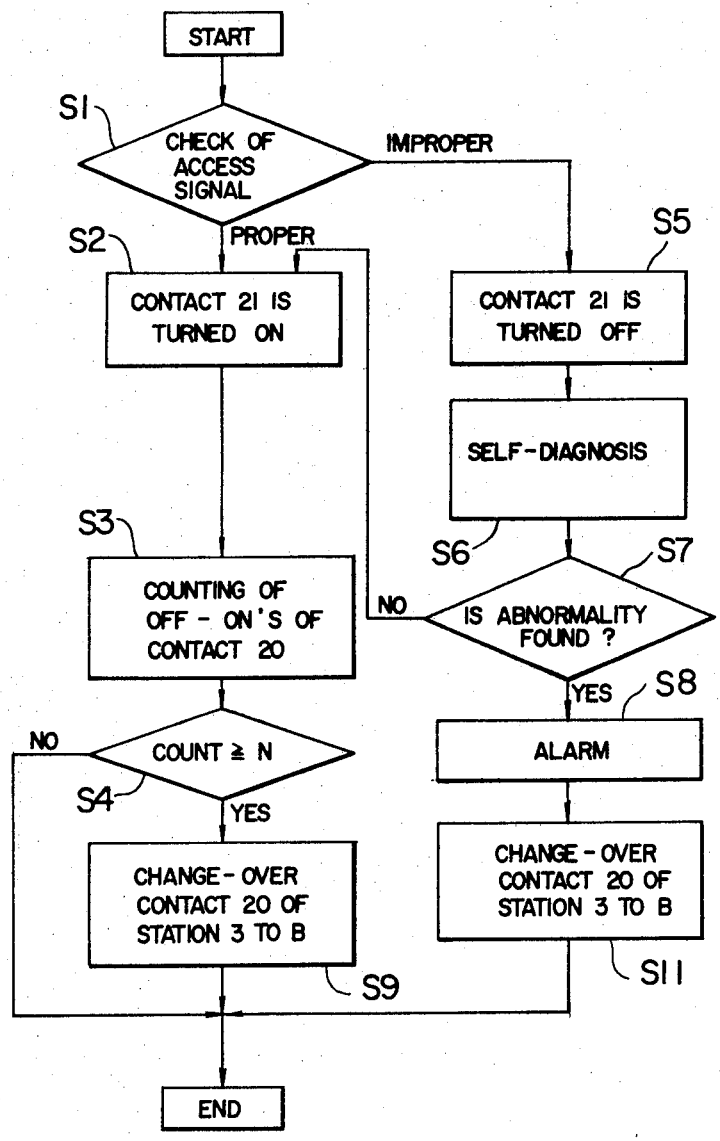
FIG. 7 is a flow chart to illustrate operation of the monitoring and disconnecting circuit provided in a primary transmission control station.

Referring to FIG. 1 which is a block diagram to illustrate the principle of the invention, a dual data transmission control system according to an embodiment of the invention comprises a pair of transmission control stations 2 and 3 of an identical construction connected to data transmission paths 4 and 5, respectively, to which in turn a plurality of subscriber stations 6 are coupled. Each of the subscriber stations 6 includes a change-over relay 20 having contacts M and B connected to the transmission paths 4 and 5, respectively, and a switching contact which can be closed to either of the contacts M and B. In this manner, only one of the transmission control stations 2 and 3 is actually used for controlling the data transmission in cooperation with the associated transmission path and in this sense referred to as the in-service transmission control station, while the other control station as well as the corresponding transmission path are left unused in the stand-by state, so long as the in-service transmission control station including the transmission path is operated properly. Both of the control stations 2 and 3 serve for performing various control and supervisory operations required for the data transmission or communication among the subscriber stations 6 such as timing, route supervision or the like operations. For the convenience' sake of description, it is assumed that the transmission control station 2 connected to the transmission path 4 is operative as the in-service station, while the control station 3 and the associated transmission path 5 are in the stand-by state. Accordingly, the switching contact of the relay switch 20 of every subscriber station 6 is closed to the contact M coupled to the transmission path 4.

Each of the subscriber stations 6 which may be of an identical construction to one another includes in addition to the relay switch 20 described above a switch 21, a receiver circuit 9, a transmitter circuit 10, an interface device 11 serving for serial-parallel conversion of data signals, temporary storage thereof and other control functions as required, an arithmetic operation unit 13, a monitoring and disconnecting circuit 26 for constantly supervising the data signals to be transferred and controlling the switch 21, and a counter 27 and a register 28 for controlling the change-over relay 20 under the command of the monitoring and disconnecting circuit 26, as will be described hereinafter. The arithmetic unit 13 is adapted to perform arithmetic and other operations in dependence on the information available from the interface device 11. It will be self-explanatory that the receiving operation of the subscriber station 6 is effected through the receiver circuit 9, while the transmitting operation is effected through the transmitter or driver circuit 10. In FIG. 1, only two subscriber stations 6 are shown for simplicity of illustration.

In the data transmission control system of the arrangement as above outlined, the information or data transmission is performed on a time division base, by using a plurality of time slots, as illustrated in FIG. 2. More specifically, the transmission control station stores therein combinations or sets of the addresses SA of the sender subscriber stations from which data or information is to be sent out and the addresses DA of the destination subscriber stations which are destined to receive the data in a manner summarized in Table I.

TABLE 1

|   | SA | DA |
|---|---|---|
| 1 | 6(1) | 6(n) |
| 2 | 6(2) | 6(n − 1) |
| 3 | 6(3) | 6(n − 2) |
| . | . | . |
| . | . | . |
| . | . | . |
| $\frac{n}{2} - 1$ | 6(j − 2) | 6(j + 1) |
| n/2 | 6(j − 1) | 6(j) |
| $\frac{n}{2} + 1$ | 6(n) | 6(1) |
| $\frac{n}{2} + 2$ | 6(n − 1) | 6(2) |
| $\frac{n}{2} + 3$ | 6(n − 2) | 6(3) |
| . | . | . |
| . | . | . |
| . | . | . |
| n − 1 | 6(j + 1) | 6(j − 2) |
| n | 6(j) | 6(j − 1) |

In dependence on these address combinations, the control station prepares access signals SH and sends to the associated transmission path for every time span or slot Δt. It is assumed that the number of the subscriber stations 6 is equal to n and the individual stations 6 are thus identified by the numbers 1 to n. The access signal SH is composed of a synchronizing signal SYN, the address SA of the sender subscriber station and the address DA of the destination subscriber station, as is shown in FIG. 2 at I. Although the access signal SH is supplied to all the subscriber stations 6, those which are allowed to respond to the access signal SH being currently issued thereby to effect the communication are limited to the subscriber stations which are identified by the contents of the addresses SA and DA contained in the currently supplied access signal SH. The subscriber station 6 identified by the address SA then prepares information signal SI consisting of the synchronizing signal and data DT, which signal is sent out to the in-service transmission path. On the other hand, at the destination subscriber station allotted with the valid address DA, an input gate is opened for receiving the send information signal SI after the address check. There exists a possibility that the information signal SI as prepared at the sender station may be input to the arithmetic unit 13 of the same station through the loop constituted by the driver circuit 10, receiver circuit 9 and the interface device 11. In order to evade such undesirable situation, appropriate lock-out means is provided to inhibit the information signal SI to be processed at the very sender station 6 that sends out the signal SI. As can be seen from the Table 1, the data transfer takes place between the subscriber stations belonging to the same combinaton set repeatedly after every period $T = n \cdot \Delta t$. Additionally, the cyclical period in which the individual subscriber station is permitted to accept the access signal SH destined for that station is fixedly predetermined. In the case of the illustrated embodiment, the subscriber station is allowed to respond to the access signal SH after every time span $T/2 = n/2 \cdot \Delta t$.

When no access signal SH is supplied to a particular subscriber station in the period predetermined for that particular station, this fact is detected by the monitoring and disconnecting circuit 26 of that particular station, whereby determination is made such that some abnormality occurs. To deal with such occurrence of abnormality, programmed operations such as shown in the flow chart of FIG. 3 are executed, which will now be described by referring also to FIG. 4 showing signal diagrams to illustrate operations of the various components in the system shown in FIG. 1. Description will be made on the assumption that the cyclical access period for the individual subscriber station is equal to T/2 and that abnormality takes place at a time point $t_c$ (FIG. 4).

After elapse of time duration corresponding to the predetermined access period for a particular subscriber station 6 as detected by a timer provided in the station, the program illustrated in FIG. 3 is started. At the step S1, check is made as to the presence of the access signal SH as well as normality or validness thereof. In accordance with the above assumption, the valid access signal is present at the time points $t_a$ and $t_b$. Consequently, execution of the program proceeds to the step S2 at which the contact 21 is turned on. At the succeeding step S3, ON-OFF times of the contact 21 is counted by the counter 27. When the valid access signal SH is successively supplied as in the case of the time points $t_a$ and $t_b$, the contact 21 is held continuously in the conductive or ON state, so that the count remains equal to zero. Accordingly, the answer at the decision step S4 is negative, whereby the execution of the program is terminated.

On the other hand, when the execution of program is started at the time point $t_c$, no valid access signal is presented to the particular subscriber station in accordance with the assumption made hereinbefore. In this case, the program routine is branched from the step S1 to a step S5 of a sub-routine at which the contact 21 is turned OFF. As the result, the particular subscriber station is disconnected from both of the transmission paths 4 and 5. At the succeeding step S6, a self-checking or diagnosis signal is produced and transferred through the loop of the interface device 11, driver circuit 10 and receiver 9. When the circulated self-check signal indicates abnormality in this loop at the next step S7, this particular subscriber station is held in the disconnected state and an alarm is produced at the step S8. The functions of the disconnected subscriber station should be preferably carried out by a stand-by subscriber station. The execution of the sub-routine described above is illustrated in a signal diagram of FIG. 4A. It will be seen that the particular subscriber station is dropped out at the time point $t_c$ and held in this state, while the other subscriber stations are maintained in the state connected to the in-service or primary transmission path to allow the system operation to be continued.

When no abnormality is found in the loop of the interface 11, transmitter driver 10 and the receiver 9 as the result of the self-diagnosis executed at the step 7, branching is made to the step S2 to close the contact 21, whereby count one is placed in the register 28 through the counter 27. Because the limit number N of the counts at the step S4, has to be in general greater than or at least equal to 2, the execution of program comes to an end at the time point $t_c$. In this connection, it should be noted that when the abnormality in the access signal SH at the time point $t_c$ is due to transient disturbance such as mixed noise, a normal access signal will have to make appearance at the time point $t_e$, in which case the program routine including the steps S1, S2, S3 and S4 is executed as in the case of the processings performed at the time points $t_a$ and $t_b$, while the counter 27 is reset to zero. The execution of program just described is illustrated in a signal timing diagram of FIG. 4B, from which it can be seen that the once disconnected subscriber station is restored at the time point $t_d$ and maintained thereafter in this state connected to the primary or in-service transmission path.

On the other hand, when the access signal SH is again subjected to abnormality also at the time point $t_d$, the count will exceed the limit value N at the step S4 after the execution of the routine through the steps S1, S5, S6, S7, S2 and S3, as the result of which the program proceeds to the step 9 at which the contact 20 is closed to the contact B connected to the stand-by transmission line 5. FIG. 4 shows a signal timing diagram to illustrate the execution of this sub-routine.

The signal wave forms indicated by the label "Data Transmission" in FIG. 4 are only for a single set of the subscriber stations, e.g. 6(1) and 6(n) among n subscriber stations listed in the Table 1. Accordingly, only the single set of the subscriber stations, e.g. 6(1) and 6(n) are changed over to the stand-by transmission path at the time point $t_d$. However, after the time elapse of $\Delta t$ from the time point $t_d$, a set of stations 6(2) and 6(n−1) will be changed over to the stand-by path 5 and after elapse of another $\Delta t$ a set of subscriber stations 6(3) and 6(n−2) will be turned to the stand-by path 5 and so forth. In other words, if the abnormality in the primary transmission path continues after the time point $t_c$, all the subscriber stations will have been sequentially changed over to the stand-by transmission path 5 by the time point $t_e$. The time span between the occurrence of abnormality and the completed change-over of all the subscriber stations to the stand-by transmission path amounts to the period T.

The transmission control station 2 for the primary or in-service transmission path 4 incorporates therein a function for detecting the abnormality in the transmission path 4 thereby to transfer the transmission control to the stand-by control station 3. The latter will then produce the access signal SH in synchronism with the one produced by the primary control station 2 at the time point $t_e$ in the case of the example illustrated above, whereby normal data transmission is carried out under the supervision of the now in-service control station 3. A variety of means for detecting the abnormality in the transmission path may be adopted for the transmission control station. For example, irregularity of the standardized access signal may be utilized as the representation of abnormality in the transmission path and the subscriber stations.

In the data transmission control system according to the invention described so far, only the subscriber station in which abnormality occurs is disconnected from the transmission path, whereby adverse influence to the other subscriber stations can be suppressed with the abnormal area being restrictively localized. On the other hand, upon detection of abnormality in the in-service transmission line, the changing-over of the subscriber stations to the stand-by transmission path can be effected rapidly. Information of the abnormal subscriber station or transmission path can be readily obtained by the alarm or the like means, thereby to allow the time taken for the repair of the abnormal areas to be significantly reduced.

FIG. 5 shows a flow chart to illustrate a modified operation of the monitoring and disconnecting circuit 26 which differs from the one shown in FIG. 3 in that successive detection of abnormality in the access signal for n times causes immediately the change-over of the contact 21 to the contact B connected to the stand-by transmission path 5 without performing the self-diagnosis by opening the switch 21. In more particular, until the (n−1)-th detections of abnormality in the access signal, the self-diagnosis is executed (at steps S6 and S7) by turning off the contact 21 (at step S5) and the corresponding step (S2 or S8) is executed. However, upon n-th detection of the abnormality at the step S10, the contact 20 is instantly changed over to the contact B at the step S9. In the case of the embodiment, since the ON-OFF operation of the contact 21 is not effected at the n-th detection of the abnormality where n is in general selected equal to 2, possible adverse influence of the ON-OFF operation of the contact 21 such as in a form of noise to the other subscriber stations through the transmission path can be more effectively reduced.

FIG. 6 shows another arrangement of the data transmission control system according to another embodiment of the invention in which all the stations inclusive of the control stations are implemented in a substantially identical configuration incorporating the monitoring and disconnecting circuit 26. The stand-by control station 3 is usually connected to the primary or in-service transmission path 4 and serves as a so-called reception-only station. To this end, the stand-by control station 3 includes the change-over switch 20 which is adapted to be changed over to the stand-by transmission path under the control of the primary control station 2 upon detection of abnormality in the primary transmission path 4.

The transmission control is usually effected by the primary control station 2 in the substantially same manner as described hereinbefore in conjunction with FIG. 2 and the Table 1. More specifically, the control station prepares the access or call signal SH and sends out successively to the transmission path or line 4 through the interface device 11, driver 10 and the contact 21. At the same time, the access signal as being sent out is fetched in through the receiver 9 and the interface device 11 to be supervised by the monitoring and disconnecting circuit 26. Accordingly, the time interval at which the signal SH is checked differs from that of the subscriber stations 6 and the check of the signal SH is performed for every Δt. On the other hand, the contact 20 of the control station 3 is usually closed to the contact M connected to the primary or in-service transmission path 4 thereby to fetch the access signal SH through the contacts 20 and 21, receiver circuit 9 and the interface device 11. The station 3 is so arranged that all the access signals SH may be accepted regardless of the addresses contained therein. Thus, the time interval for monitoring the signal SH is equal to Δt as is in the case of the control station 2.

Logical functions of the monitoring and disconnecting circuit 26 of the subscriber stations 6 are the same as those described hereinbefore in conjunction with FIGS. 3 and 5. At the control station 2, the contacts 20 and 21 are controlled in the manner illustrated in the flow chart of FIG. 7 which differs from the one shown in FIG. 3 in that the contact 20 of the control station 3 is changed over to the contact B connected to the stand-by transmission path 3 at steps S9 or S11 in response to the detection of abnormality either in the control station 3 itself at step S7 and/or in the primary transmission path 4. In other words, at any time when abnormality is detected either at the control station 2 itself or in the in-service transmission path 4, the data transmission as well as control therefor are then transferred to the stand-by system (3 and 5). The programmed routine similar to the one illustrated in FIG. 5 can be readily realized by adding the step S11 (FIG. 7) in succession to the step S8 (FIG. 5) and replacing the step S9 (FIG. 5) by the step S9' (FIG. 7).

When the control station 3 is changed over to the stand-by transmission line by the signal 28 from the station 2, the station 3 begins to control the data transmission with an appropriate delay in the manner described hereinbefore in conjunction with FIG. 2. The arrangement shown in FIG. 6 brings about an advantage that the data transmission control can be realized inexpensively by virtue of the substantially identical construction of all the stations 2, 3 and 6.

From the foregoing description, it will now be appreciated that the invention has provided an improved data or signal transmission control system having dual transmission paths which is capable of effecting smoothly the changing-over of the data transmission from the in-service path to the stand-by path upon malfunction of the former without any substantial loss in the data or information. Further, because the abnormal area can be localized, the time required for the subsequent repairing procedure can be significantly reduced.

I claim:

1. A signal transmission control system comprising; two individual signal transmission paths, a pair of transmission control stations one of which serves as a primary control station and being coupled to one of said signal transmission paths, while the other of said transmission control stations serves as a stand-by control station coupled to the other of said signal transmission paths, and a plurality of subscriber stations normally connected to said one transmission path and adapted to perform reception and transmission of information data to one another in accordance with access signals issued from said primary transmission control station, wherein each of said subscriber stations is composed of first means for disconnecting the associated subscriber station a part of which is constituted by said first means itself from said one transmission path when said access signal is unavailable properly within a predetermined time span, second means for performing self-checking in said associated subscriber station after said subscriber station has been disconnected from said one transmission path, means for holding said associated subscriber station in the disconnected state when abnormality is detected in said subscriber station as a result of said self-checking, and third means for switching said associated subscriber station to said other signal transmission path when no abnormality is found in said associated subscriber station as the result of said self-checking, and wherein upon occurrence of an abnormality in the signal transmission, the signal transmission control functions of said primary control station are transferred to said stand-by transmission control station.

2. A signal transmission control system according to claim 1, wherein said third means is adapted to switch said associated subscriber station to said other transmission path when abnormality in said associated subscriber station is successively detected for a predetermined number of times.

3. A signal transmission control system according to claim 1, wherein said first means is adapted to switch said associated subscriber station to said other transmission path immediately without previously disconnecting said associated subscriber station from said one transmission path when the state in which said access signals are unavailable properly is repeated successively for a predetermined number of times.

4. A signal transmission control system according to claim 1, wherein a stand-by subscriber station is provided to replace the associated subscriber station which is held in the disconnected state by said third means.

5. A signal transmission control system comprising; two individual transmission paths and a plurality of stations each incorporating therein at least signal transmitting and receiving function and self-checking function, one of said stations being connected to primary one of said transmission paths which is usually used for signal transmission and being adapted to serve as a transmission control station for preparing access signals and sending out to said primary transmission path thereby to enable data transmission to be performed among others of said stations, while said other stations are adapted to serve as transmitter and receiver stations coupled to said primary transmission path for performing exchange of data with one another in accordance with said access signals issued from said transmission control station, wherein each of said other stations includes first means for disconnecting the associated station a part of which is constituted by said first means itself from said primary transmission channel to perform the self-checking and second means for holding said associated station in the disconnected state when abnormality is found in said associated station itself, while switching said associated station to the other stand-by transmission path when abnormality is found in said primary transmission path, while said one station serving as the transmission control station includes said first means and third means which is arranged such that upon detection of abnormality either in said self-checking or in said primary transmission path, one of said other stations is caused to serve as the transmission control station in place of said one station for preparing said access signal and sending out to said stand-by transmission path thereby to enable data exchange to be performed among remaining ones of said other stations.

6. A signal transmission control system including two individual transmission paths, a pair of transmission control stations connected, respectively, to said transmission paths, one of said transmission control stations being set in an operative state, while the other is set in a stand-by state, a plurality of subscriber stations normally coupled to said transmission path to which said control station in the operative state is connected and adapted to execute data exchange with one another in accordance with the access signal produced from said operative control station, wherein each of said subscriber stations is composed of first means for disconnecting the associated subscriber station a part of which is constituted by said first means itself from said operative transmission path when said access signal is unavailable properly within a predetermined time span, second means for performing self-checking in said associated subscriber station after said subscriber station has been disconnected from said operative transmission path, means for holding said associated subscriber station in the disconnected state when abnormality is detected in said subscriber station as a result of said self-checking, and third means for switching said associated subscriber station to the other of said signal transmission path when no abnormality is found in said associated subscriber station as the result of said self-checking, and wherein upon occurrence of abnormality in the signal transmission, the signal transmission control functions of said operative control station are transferred to said stand-by transmission control station.

* * * * *